United States Patent
Giles et al.

(10) Patent No.: US 6,647,172 B2
(45) Date of Patent: Nov. 11, 2003

(54) IMAGING TECHNIQUE FOR USE WITH OPTICAL MEMS DEVICES

(75) Inventors: Randy Clinton Giles, Whippany, NJ (US); David Thomas Neilson, Old Bridge, NJ (US); Roland Ryf, Aberdeen, NJ (US)

(73) Assignees: Lucent Technologies Inc., Murray Hill, NJ (US); Agere Systems Inc., Allentown, PA (US)

( * ) Notice: Subject to any disclaimer, the term of this patent is extended or adjusted under 35 U.S.C. 154(b) by 91 days.

(21) Appl. No.: 09/896,005

(22) Filed: Jun. 29, 2001

(65) Prior Publication Data

US 2003/0002782 A1 Jan. 2, 2003

(51) Int. Cl.[7] .................................................. G02B 6/35
(52) U.S. Cl. ........................................... 385/18; 385/16
(58) Field of Search ................................ 385/15–20, 24

(56) References Cited

U.S. PATENT DOCUMENTS

| | | | |
|---|---|---|---|
| 5,994,963 A | | 11/1999 | Kawai et al. ................ 330/277 |
| 2002/0172451 A1 | * | 11/2002 | Gupta et al. .................. 385/16 |

FOREIGN PATENT DOCUMENTS

| | | | | |
|---|---|---|---|---|
| CA | 2 325 611 | 6/2001 | ........... | G02B/26/08 |
| EP | 1 102 096 | 5/2001 | ............ | G02B/6/35 |

OTHER PUBLICATIONS

Lin, L–Y et al.: "On the Expandability of Free–Space Micromachined Optical Cross Connects", Journal of Lightwave Technology, IEEE, New York, US, vol. 18, No. 4 Apr. 2000, pp. 482–489.

Neilson, et al.: "Scalable Micro Mechanical Optical Cross-connects", LEOS 2000 IEEE Annual Meeting Conference Proceedings, vol. 1, Nov. 2000, pp. 48–49, Piscataway, NJ.

* cited by examiner

*Primary Examiner*—Brian Healy
*Assistant Examiner*—Kevin S Wood
(74) *Attorney, Agent, or Firm*—Eugene J. Rosenthal

(57) ABSTRACT

Using an imaging system, an optical MEMS devices is imaged so that in combination with an actual one or more other optical MEMS devices, or images thereof, a single virtual optical MEMS device is formed that has the size of each of the optical MEMS devices combined. The physical size of the arrangement may be reduced by compacting the optical path, e.g., using appropriate conventional mirrors, and/or employing folded arrangements, i.e., arrangements in which there is only one MEMS device stage that does double duty for both input and output through the use of at least one conventional mirror. The imaging system may reproduce the angle of reflection of the light from the micro mirror, e.g., using a telecentric system. A prism may be employed to align the various optical MEMS devices, or images thereof.

28 Claims, 8 Drawing Sheets

701 702 703

IMAGING TECHNIQUE FOR USE WITH OPTICAL MEMS DEVICES

TECHNICAL FIELD

This invention relates to the art of optical microelectromechanical systems (MEMS) devices, and more particularly, to all-optical switching using MEMS devices.

BACKGROUND OF THE INVENTION

One solution for all-optical switching employs two MEMS devices each containing an array of tiltable micro mirrors, e.g., small mirrors, which can reflect light, which herein refers to any radiation in the wavelength of interest, whether or not in the visible spectrum. An optical path is established for light supplied from an input source, e.g., an optical fiber, to an output, e.g., an output fiber, by steering the light using a first micro mirror on the first optical MEMS device, the first micro mirror being associated with the input fiber, onto a second micro mirror on the second optical MEMS device which is associated with the output fiber. The second micro mirror then steers the light into the output fiber. Each fiber connected to the system is considered a port of the system, the input fibers being the input ports and the output fibers being the output ports.

A problem in the art of all-optical switching using MEMS devices is that in order to increase number of ports in the system, i.e., the number of fibers, it has been necessary to increase the number of micro mirrors employed to perform the switching function. In the prior art, as noted above, the first optical MEMS device contained all of the first micro mirrors integrated thereon and the second optical MEMS device contained all of the second micro mirrors integrated thereon. Since the size of the optical MEMS device is a direct function of the number of micro mirrors on the optical MEMS device, and the number of micro mirrors required is directly proportional to the maximum number of ports available in the all-optical switch, to increase the maximum number of ports available in the all-optical switch requires one to employ a larger optical MEMS device.

Unfortunately, limitations on manufacturing capability and the large package size have effectively limited the optical MEMS device at the present time to 1296 micro mirrors. Furthermore, even if the size of the micro mirrors could be effectively shrunk, there is still a problem in that control signals need to be brought to each micro mirror. The routing of these control signals consumes large amounts of space on the optical MEMS device, which would thus result in the optical MEMS device being very large. Additionally, there are control signals for each micro mirror that must be brought to the optical MEMS device from off of its substrate. In order to make these connections, additional large amounts of space is required on the optical MEMS device.

As a result of all these space requirements, the optical MEMS chip is quite large, and so, due to the manufacturing capability limits, the number of micro mirrors that can be placed on a single optical MEMS device is limited. The limitation on the number of micro mirrors, in turn, limits the number of ports of an all-optical switch.

Additionally, the micro mirrors presently available have a limited effective range through which they can be tilted. The limitation on the effective range further limits the number of ports that can be implemented in an all-optical switch employing such optical MEMS devices because each micro mirror on the first optical MEMS device must be able to direct the light incident on it to each of the micro mirrors on the second optical MEMS device. The ability to so direct the light is a function of the effective tilt range of the micro mirrors. In other words, greater effective tilt angle allows each micro mirror to direct its light over a greater area. For optical MEMS devices arranged as an optical switch, the greatest tilt angle required is for connections between micro mirrors in the opposing corners of the optical MEMS devices. For example, the most tilt is required by a micro mirror at the top right of the first MEMS device which must direct its light to a micro mirror at the bottom left of the second MEMS device. Thus, the size of the micro mirror array that can be employed in an optical switch is limited by the effective tilt range of its optical MEMS devices.

Increasing the separation distance between the two optical MEMS devices decreases the required tilt angle, which would allow the use of larger micro mirror arrays without changing the effective tilt range of the micro mirrors. Doing so, however, increases the beam diffraction, which, disadvantageously, requires the use of a micro mirror with a larger diameter or results in a loss of some of the light. Since using a larger micro mirror requires additional space, doing so increases the distance between the micro mirrors on the optical MEMS device, which further increases the size of the optical MEMS device for the same number of micro mirrors. As a result of increasing the size of the optical MEMS device, a greater tilt angle is required to couple the opposing corners of the opposing optical MEMS devices. Thus, essentially, additional separation of the opposing optical MEMS devices does not help to increase the number of ports due to the limited available tilt angle.

Additionally, because the package of the MEMS device is considerably larger than the area thereof that contains the micro mirrors, it is not possible with current designs to place the micro mirror areas of multiple MEMS devices directly adjacent to one another to form a single, composite, larger MEMS device. Nor does it seem likely that future designs will facilitate doing so due to the need for a large edge area on the MEMS device to make the multitude of connections that are required.

SUMMARY OF THE INVENTION

We have recognized that the limitations on the number of ports in an all-optical switch due to the constraints on the size and/or effective tilt range of the optical MEMS devices can be overcome, in accordance with the principles of the invention, by imaging one or more optical MEMS devices using an imaging system in combination with an actual other optical MEMS device, or an image thereof, to form a single virtual optical MEMS device that has the size of each of the optical MEMS devices combined. The physical size of the arrangement may be reduced by compacting the optical path, e.g., using appropriate conventional mirrors, and/or employing folded arrangements, i.e., arrangements in which there is only one MEMS device stage that does double duty for both input and output through the use of at least one conventional mirror. In one embodiment of the invention, the imaging system reproduces the angle of reflection of the light from the micro mirror. This may be achieved using a telecentric system, also known as a 4 f system.

In various embodiments of the invention, in order to combine the images and/or actual devices of multiple optical MEMS devices, the imaging systems may be at different angles to each other, and it may also be required that the lenses of the imaging system that are optically furthest from the micro mirror overlap each other. To compensate for such different angles and overlapping, in one embodiment of the invention, a prism may be inserted for each image of an optical MEMS device at the plane in which its image is formed. The prism is designed to tilt all the angles of the light for an optical MEMS device opposite to the angle between the lens of the imaging system for that optical MEMS device that is furthest from that optical MEMS device and at least the lens of the imaging system of one other optical MEMS device that is furthest from that other optical MEMS device. In another embodiment of the invention, a lens may be employed in lieu of a prism to perform the same function. In yet another embodiment of the invention, folding mirrors may be similarly employed.

The overall system is arranged to account for inversion of any images of the MEMS devices by the imaging systems employed.

DETAILED DESCRIPTION

Figure 1:
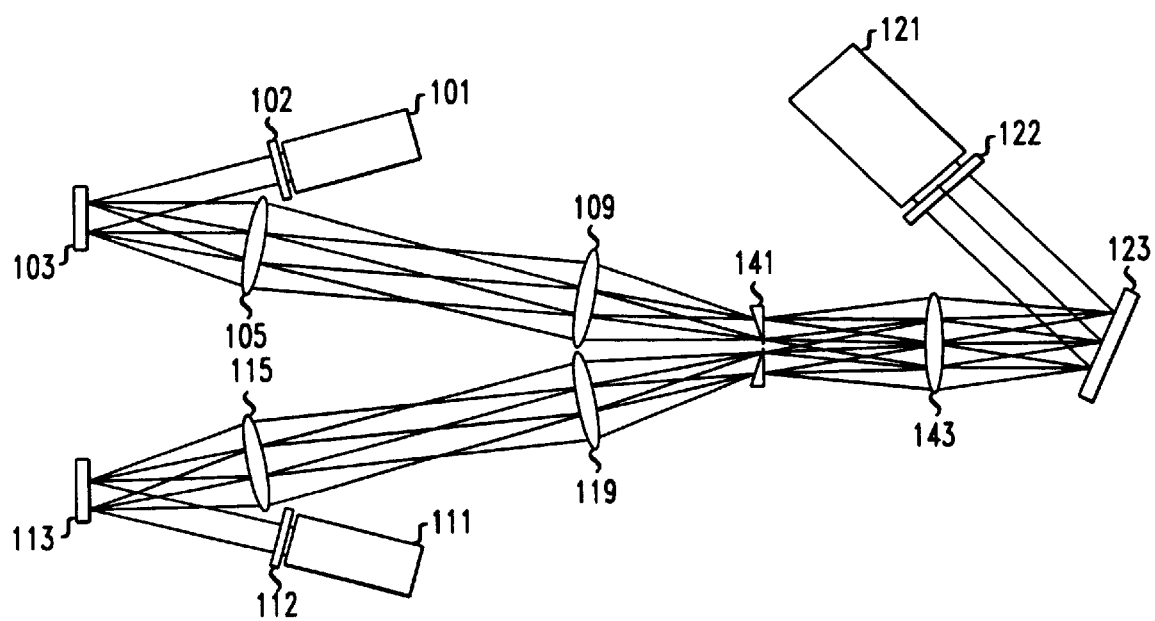
FIG. 1, which shows one embodiment of an all-optical switching arrangement in which each of two optical MEMS devices are imaged using respective imaging systems to form a virtual optical MEMS device that has the size of each of the optical MEMS devices combined.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware which is expressly or implicitly shown.

Unless otherwise explicitly specified herein, the drawings are not drawn to scale.

Additionally, unless otherwise explicitly specified herein, any lens shown and/or described herein is actually an optical system having the particular specified properties of that lens. Such an optical system may be implemented by a single lens element but is not necessarily limited thereto. Similarly, where a mirror is shown and/or described what is actually being shown and/or described is an optical system with the specified properties of such a mirror, which may be implemented by a single mirror element but is not necessarily limited to a single mirror element. This is because, as is well known in the art, various optical systems may provide the same functionality of a single lens element or mirror but in a superior way, e.g., with less distortion. Furthermore, as is well known in the art, the functionality of a curved mirror may be realized via a combination of lenses and mirrors and vice versa. Moreover, any arrangement of optical components that are performing a specified function, e.g., an imaging system, gratings, coated elements, and prisms, may be replaced by any other arrangement of optical components that perform the same specified function. Thus, unless otherwise explicitly specified here, all optical elements or systems that are capable of providing specific function within an overall embodiment disclosed herein are equivalent to one another for purposes of the present disclosure.

The term micro-electromechanical systems (MEMS) device as used herein is intended to mean an entire MEMS device or any portion thereof. Thus, if a portion of a MEMS device is inoperative, or if a portion of a MEMS device is occluded, such a MEMS device is nonetheless considered to be a MEMS device for purposes of the present disclosure.

We have recognized that the limitations on the number of ports in an all-optical switch due to the constraints on the size and/or effective tilt range of the optical MEMS devices can be overcome, in accordance with the principles of the invention, by imaging one or more optical MEMS devices using an imaging system in combination with an actual other optical MEMS device, or an image thereof, to form a single virtual optical MEMS device that has the size of each of the optical MEMS devices combined. This can be seen in FIG. 1, which shows one embodiment of an all-optical switching arrangement in which each of two optical MEMS devices are imaged using respective imaging systems to form a virtual optical MEMS device that has the size of each of the optical MEMS devices combined. Shown in FIG. 1 are a) first input fiber bundle 101, b) first input micro lens array 102, c) first input MEMS device 103, d) lens 105, e) lens 109, f) second input fiber bundle 111, g) second input micro lens array 112, h) second input MEMS device 113, i) lens 115, j) lens 119, k) first output fiber bundle 121, l) first output micro lens array 122, m) first output MEMS device 123, n) prism 141, and o) field lens 143.

First input fiber bundle 101 supplies optical signals to be switched. More specifically, each fiber of first input fiber bundle 101 is an input port to the switching system of FIG. 1. The light supplied by each fiber of first input fiber bundle 101 passes through a respective corresponding micro lens that is part of first input micro lens array 102. The function of each micro lens is to collimate the beam of light supplied from its respective associated input fiber. In alternative embodiments of the invention, in lieu of employing a separate micro lens array, a lens may be integrated with each fiber of input fiber bundle 101 in an arrangement that forms a collimator.

The beams of light passing from first input micro lens array 102 each falls upon a respective micro mirror of first input MEMS device 103. Each micro mirror of first input MEMS device 103 is set to reflect the beam of light incident on it at a respective prescribed angle. The particular prescribed angle is selected so that in combination with the angle of a corresponding respective micro mirror of first output MEMS device 123 the light is directed to a preselected fiber in first output fiber bundle 121.

After reflecting off of its particular micro mirror, each beam of light passes to prism 141 via lens 105 and lens 109. Lens 105 and lens 109 form an imaging system. The imaging system is arranged so that the angles of incidence of each beam produced at prism 141 is a function of the angle of each micro mirror of first input MEMS device 103. In simpler embodiments of the invention, the imaging system is arranged so that it reproduces the angle of reflection of the light from each micro mirror of first input MEMS device 103 at prism 141. Thus, there is a direct imaging of each micro mirror of first input MEMS device 103 to the location of prism 141. Note that although two lenses are shown making up the imaging system, this is for pedagogical and clarity purposes only. Those of ordinary skill in the art will readily appreciate that any imaging system, e.g., a system using one or more lenses, may be employed.

In one embodiment of the invention, a telecentric system, also known as a 4 f system is employed as the imaging system. By using a telecentric system, such systems being well known in the art, the angle of reflection of the light of each beam from first input MEMS device 103 is reproduced when that light reaches prism 141. Note that, since the telecentric system may be inverting, the respective corresponding micro mirrors of first output MEMS device 123 may not be in the same location as they would be had an imaging system not been employed. However, since the one-to-one nature of the mapping of micro mirrors is preserved by the imaging system, the inversion can easily be accounted for in the control software of the system to properly tilt the micro mirrors of first output MEMS device 123 to direct the light from the image to the prescribed output fiber of first output fiber bundle 121.

Note that the imaging system may also change the size of the image as compared with the original. This would allow the micro mirrors of first output MEMS device 123 to be a different size that those of first input MEMS device 103, as well as allowing the micro mirror spacing of first output MEMS device 123 to be a different than that of first input MEMS device 103. Doing so, however, will scale the angle of tilt of each of the micro mirrors of first input MEMS device 103 as it appears in the image, which will necessitate complementary compensation of the actual tilt in order to properly address the image to the micro mirrors of first output MEMS device 123.

Furthermore, it is possible to employ optical splitters, e.g., between lenses 105 and 109, to create multiple signal paths through the system, e.g., to implement a multicast, broadcast, monitoring, protection and restoration functions. Advantageously, great flexibility in system design is achieved.

Second input fiber bundle 111 also supplies optical signals to be switched. More specifically, each fiber of second input fiber bundle 111 is also an input port to the switching system of FIG. 1. The light supplied by each fiber of second input fiber bundle 111 passes through a respective corresponding micro lens that is part of second input micro lens array 112. The function of each micro lens is to collimate the beam of light supplied from its respective associated input fiber. In alternative embodiments of the invention, in lieu of employing a separate micro lens array, a lens may be integrated with each fiber of second input fiber bundle 111 in an arrangement that forms a collimator.

The beams of light passing from second input micro lens array 112 each falls upon a respective micro mirror of second input MEMS device 113. Each micro mirror of second input MEMS device 113 is set to reflect the beam of light incident on it at a respective prescribed angle. The particular prescribed angle is selected so that in combination with the angle of a corresponding respective micro mirror of first output MEMS device 123 the light is directed to a preselected fiber in first output fiber bundle 121.

After reflecting off of its particular micro mirror, each beam of light passes to prism 141 via lens 115 and lens 119. Lens 115 and lens 119 form an imaging system. The imaging system is arranged so that the angles of each micro mirror of second input MEMS device 113 is reproduced at prism 141. Thus, there is a direct imaging of each micro mirror of second input MEMS device 113 to the location of prism 141. Note that although two lenses are shown making up the imaging system, this is for pedagogical and clarity purposes only. Those of ordinary skill in the art will readily appreciate that any imaging system, e.g., a system using one or more lenses, may be employed.

In one embodiment of the invention, a telecentric system, also known as a 4 f system is employed as the imaging system. By using a telecentric system, such systems being well known in the art, the angle of reflection of the light of each beam from second input MEMS device 115 is reproduced when that light reaches prism 141. Note that, since the telecentric system may be inverting, the respective corresponding micro mirrors of first output MEMS device 123 may not be in the same location as they would be had an imaging system not been employed. However, since the one-to-one nature of the mapping of micro mirrors is preserved by the imaging system, the inversion can easily be accounted for in the control software of the system to properly tilt the micro mirrors of first output MEMS device 123 to direct the light from the image to the prescribed output fiber of first output fiber bundle 121. Note that although two lenses are shown making up the telecentric system, this is for pedagogical and clarity purposes only. Those of ordinary skill in the art will readily appreciate that any telecentric system, e.g., system using more lenses, may be employed.

Note that the imaging system may also change the size of the image as compared with the original. This would allow the micro mirrors of first output MEMS device 123 to be a different size that those of second input MEMS device 113, as well as allowing the micro mirror spacing of first output MEMS device 123 to be a different than that of second input MEMS device 113. Doing so, however, will scale the angle of tilt of each of the micro mirrors of second input MEMS device 113 as it appears in the image, which will necessitate complementary compensation of the actual tilt in order to properly address the image to the micro mirrors of first output MEMS device 123.

Furthermore, it is possible to employ optical splitters, e.g., between lenses 115 and 119, to create multiple signal paths through the system, e.g., to implement a multicast, broadcast, monitoring, protection and restoration functions. Advantageously, great flexibility in system design is achieved.

The function of prism 141 is to bend the paths of the image of first input MEMS device 103 and the image of second input MEMS device 113. In the embodiment of the invention shown in FIG. 1, the bending is performed so that after passing through prism 141 the resulting image appears as if first input MEMS device 103 and second input MEMS device 113 are adjacent to each other with the point at which they meet being along the line that passes from the center of field lens 143 through the center of prism 141. Thus, in accordance with the principles of the invention, an image is produced of a single input MEMS device having the combined size of first input MEMS device 103 and second input MEMS device 113. This image acts as a virtual MEMS input device.

In the embodiment of the invention shown in FIG. 1, prism 141 has at least two sections, one for bending the image of first input MEMS device 103 and the other for bending the image of second input MEMS device 113. In practice, the two sections may be separate prisms, or a single integrated device may be employed. Preferably, all the beams of light of the image of first input MEMS device 103 are bent the same amount and similarly the beams of light of the image of second input MEMS device 113 are all bent the same amount. However, the amounts by which all the beams of light of the image of first input MEMS device 103 are bent need not be the same as the amount that all the beams of light of the image of second input MEMS device 113 are bent. Those of ordinary skill in the art will recognize that the function of prism 141 may be carried out with various other lens arrangements as well. The particular arrangement for carrying out the function of prism 141 will be selected based on design considerations such as cost and overall-optical system architecture, i.e., the overall lensing system employed.

The light of the image of the combined optical MEMS device passes through optional field lens 143 on its way to first output MEMS device 123. Optional field lens translates the angle at which the light is incident onto each micro mirror into a position to which the light will be directed. This allows all the micro mirrors of first input MEMS device 103 and second input MEMS device 113 to be homogenized, in that all micro mirrors having the same tilt will direct their light to the same position. Furthermore, the field lens refocuses each of the beams that pass through it, thus reducing loss.

The beams of light passing from field lens 143 each falls upon a respective micro mirror of first output MEMS device 123. Each micro mirror of first output MEMS device 123 is set to reflect the beam of light incident on it at a respective angle. The particular angle is selected so that the light incident on the micro mirror is reflected to particular fiber of first output fiber bundle 121 that is to receive the light and act as output port for that light.

The beams of light passing from each micro mirror of first output MEMS device 123 pass through a respective micro lens of micro lens array 122. The function of each micro lens is to couple the light beam into its respective associated output fiber. In alternative embodiments of the invention, in lieu of employing a separate micro lens array, a lens may be integrated with each fiber of output fiber of fiber bundle 121 in an arrangement that forms a collimator. The light from each of micro lens of micro lens array 122 then passes into the respective output fiber bundle that is associated with the micro lens.

The embodiment of the invention shown in FIG. 1 is especially useful for asymmetric systems in which, for example, the number of input ports is greater than the number of output ports.

Figure 2:
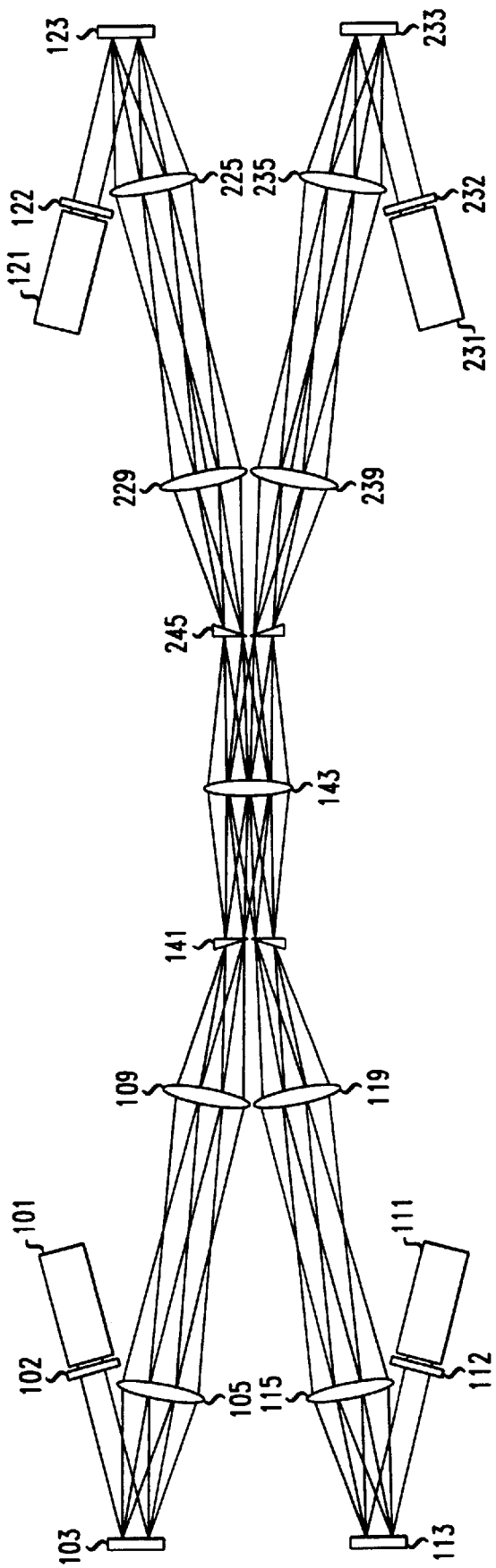
FIG. 2 shows an all-optical switching arrangement in which two input optical MEMS devices are imaged using an imaging system to form a virtual input optical MEMS device that has the size of each of the input optical MEMS devices combined and in which two output optical MEMS devices are imaged using an imaging system to form a virtual output optical MEMS device that has the size of each of the output optical MEMS devices combined.

FIG. 2 shows one embodiment of an all-optical switching arrangement in which two input optical MEMS devices are imaged using an imaging system to form a virtual input optical MEMS device that has the size of each of the input optical MEMS devices combined and in which two output optical MEMS devices are imaged using an imaging system to form a virtual output optical MEMS device that has the size of each of the output optical MEMS devices combined. Shown in FIG. 2 are a) first input fiber bundle 101, b) first input micro lens array 102, c) first input MEMS device 103, d) lens 105, e) lens 109, f) second input fiber bundle 111, g) second input micro lens array 112, h) second input MEMS device 113, i) lens 115, j) lens 119, k) first output fiber bundle 121, l) first output micro lens array 122, m) first output MEMS device 123, n) prism 141, o) field lens 143, q) lens 225, r) lens 229, s) second output fiber bundle 231, t) second output micro lens array 232, u) second output MEMS device 233, v) lens 235, w) lens 239, and x) prism 245.

The input section, i.e., all elements in FIG. 2 to the left of field lens 143, and operation thereof, as well field lens 143 and operation thereof, is the same as described for the like numbered components of FIG. 1.

Similarly, all the elements of FIG. 2 to the right of field lens 143 operate in the reverse manner. Thus, an image of a MEMS device having the combined size of first output optical MEMS device 123 and second optical MEMS device 233 is formed by the imaging systems made up of a) lens 225 and lens 229 and b) lens 235 and 239, respectively, and prism 245. This image acts as a virtual MEMS output device. Light from field lens 143 which falls on the image of a particular micro mirror on the image of the combined output optical MEMS device will travel through the respective imaging system which projects the image to the actual micro mirror which is imaged. It will be reflected off of this micro mirror and directed so as to pass through a micro lens and into the output fiber to which the output micro mirror is pointed.

More specifically, after the light of the image of the combined input optical MEMS device passes through optional field lens 143 it encounters prism 245, which performs the inverse function of prism 141, in that it directs the light incident on it into two directions, the first being through the imaging system made up of lens 225 and lens 229 and the second being through the imaging system made up of lens 235 and 239. Those beams which are incident on prism 245 at point which correspond to an image of first output MEMS device 123 are directed by prism 245 to the imaging system made up of lenses 225 and 229. Likewise, those beams which are incident on prism 245 at point which correspond to an image of second output MEMS device 233 are directed by prism 245 to the imaging system made up of lenses 235 and 239.

Note that although two lenses are shown making up the imaging system, this is for pedagogical and clarity purposes only. Those of ordinary skill in the art will readily appreciate that any imaging system, e.g., a system using one or more lenses, may be employed.

In one embodiment of the invention, the imaging system made of lenses 225 and 229 and lenses 235 and 239 are each telecentric systems, also known as 4 f systems. By using a telecentric system, such systems being well known in the art, the angle of reflection of the light of each beam as it enters each imaging system from prism 245 is reproduced when that light reaches its respective one of output MEMS devices 123 and 233. Note that, since the telecentric system may be inverting, the respective corresponding micro mirrors of respective one of output MEMS devices 123 and 233 may not be in the same location as they would be had an imaging system not been employed. However, since the one-to-one nature of the mapping of micro mirrors is preserved by the imaging system, the inversion can easily be accounted for in the control software of the system to properly tilt the micro mirrors to direct the light from the image to the prescribed output fiber.

The imaging system may also change the size of the image as compared with the original for the same principle reasons and requiring the same design considerations, as described hereinabove in connection with the input section of the optical switching arrangement shown in FIG. 2. Likewise, it is possible to employ optical splitters, within the imaging systems for the same principle reasons and requiring the same design considerations as described hereinabove in connection with the input section of the optical switching arrangement shown in FIG. 2.

The beams of light passing from the imaging system of lenses 225 and 229 each falls upon a respective micro mirror of first output MEMS device 123. As described hereinabove in connection with FIG. 1, each micro mirror of first output MEMS device 123 is set to reflect the beam of light incident on it at a respective angle. The particular angle is selected so that the light incident on the micro mirror is reflected to particular fiber of first output fiber bundle 121 that is to receive the light and act as output port for that light.

The beams of light passing from each micro mirror of first output MEMS device 123 passes through a respective micro lens of micro lens array 122. The function of each micro lens is to couple the light beam into its respective associated output fiber. In alternative embodiments of the invention, in lieu of employing a separate micro lens array, a lens may be integrated with each fiber of fiber bundle 121 in an arrangement that forms a collimator. The light from each micro lens of micro lens array 122 then passes into the respective output fiber bundle that is associated with the micro lens.

Similarly, the beams of light passing from the imaging system of lenses 235 and 239 each falls upon a respective micro mirror of second output MEMS device 233. Each micro mirror of second output MEMS device 233 is set to reflect the beam of light incident on it at a respective angle. The particular angle is selected so that the light incident on the micro mirror is reflected to particular fiber of second output fiber bundle 231 that is to receive the light and act as output port for that light.

The beams of light passing from each micro mirror of second output MEMS device 233 passes through a respective micro lens of micro lens array 232. The function of each micro lens is to collimate the beam of light supplied to its respective associated input fiber. In alternative embodiments of the invention, in lieu of employing a separate micro lens array, a lens may be integrated with each output fiber of fiber bundle 231 in an arrangement that forms a collimator. The light from each micro lens of micro lens array 232 then passes into the respective output fiber bundle that is associated with the micro lens.

In effect then, virtual input MEMS device and virtual output MEMS devices are created and the virtual output MEMS device and the virtual input MEMS device are arranged to form a cross-connect.

Note that the system of FIG. 2 is totally symmetrical in operation. Thus, input ports could be used as output ports, and vice-versa. However, given the arrangement of FIG. 2 without more, there can only be one fiber on the left coupled to any one fiber on the right.

Figure 3:
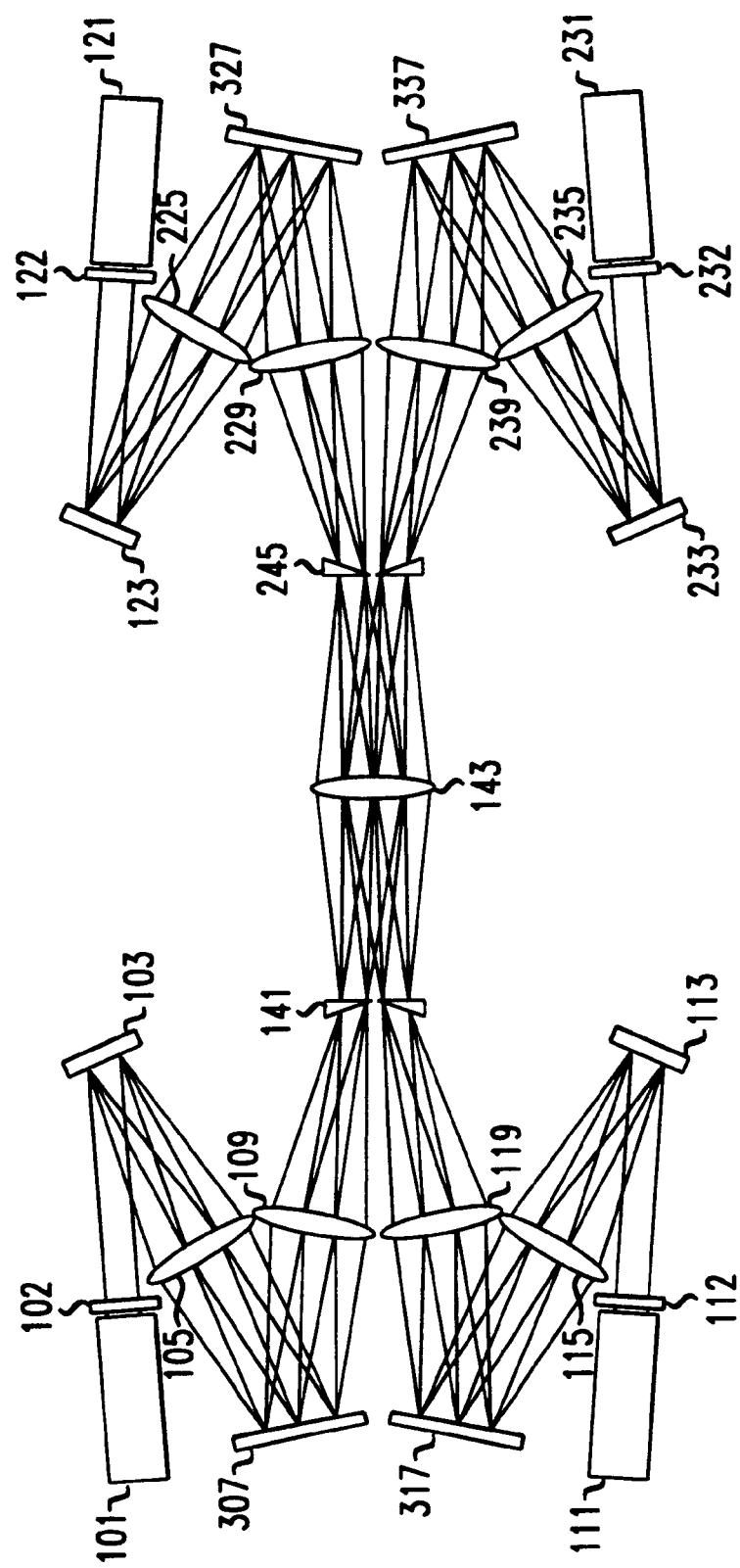
FIG. 3 shows a compact embodiment of an all-optical switching arrangement in which two input optical MEMS devices are imaged using an imaging system to form a virtual input optical MEMS device that has the size of each of the input optical MEMS devices combined and in which two output optical MEMS devices are imaged using an imaging system to form a virtual output optical MEMS device that has the size of each of the output optical MEMS devices combined.

FIG. 3 shows a compact embodiment of an all-optical switching arrangement in which two input optical MEMS devices are imaged using an imaging system to form a virtual input optical MEMS device that has the size of each of the input optical MEMS devices combined and in which two output optical MEMS devices are imaged using an imaging system to form a virtual output optical MEMS device that has the size of each of the output optical MEMS devices combined. Shown in FIG. 3 are the same elements shown in FIG. 2 and the additional elements mirrors 307, 317, 327, and 337. The operation of all elements of FIG. 3 is the same as described for the like numbered components of FIGS. 1 and 2. However, since the direction of the light beams along their path are reversed by mirrors 307, 317, 327, and 337, the location and/or orientation of the fiber bundles, their associated micro lens arrays, as well as lens 109, 115, 225, and 235, each of which is part of a respective imaging system are changed. This enables the more compact optical path shown in FIG. 3 to be realized, as will be appreciated by those of ordinary skill in the art. Note that mirrors 307, 317, 327, and 337 are each located within a respective imaging system, but operation of the imaging system may remain the same as if the mirrors were not present. Alternatively, one or more of mirrors 307, 317, 327, and 337 may be made to have an operational effect on their respective imaging system other than changing the direction of the light within its associated imaging system, e.g., by making the mirrors curved.

Figure 4:
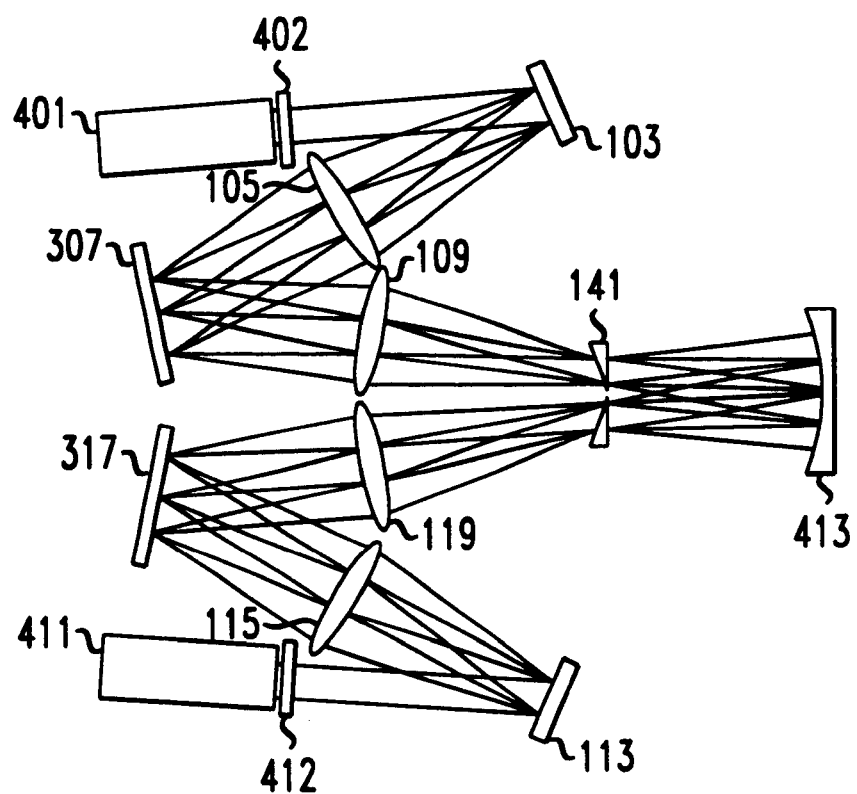
FIG. 4 shows an exemplary embodiment of the invention in which the system is folded.

FIG. 4 shows another exemplary embodiment of the invention in which the system is folded. Shown in FIG. 4 are a) first fiber bundle 401, b) first micro lens array 402, c) first MEMS device 103, d) lens 105, e) lens 109, f) second fiber bundle 411, g) second micro lens array 412, h) second MEMS device 113, i) lens 115, j) lens 119, k) prism 141, l) mirrors 307 and 317, and m) folding mirror 413.

Unlike the previously described embodiments, fiber bundle 401 contains both input and output fibers, so that fiber bundle 401 acts as both input and output ports. Light from input fibers passes through a respective associated micro lens of first micro lens array 402. The light is reflected off of a corresponding associated micro mirror of first MEMS device 103 and passes an through an imaging system which is made up of lenses 105 and 109 in FIG. 4. As noted hereinabove, although two lenses are shown making up the imaging system, this is for pedagogical and clarity purposes only. Those of ordinary skill in the art will readily appreciate that any imaging system, e.g., a system using one or more lenses, may be employed. In one embodiment of the invention, a telecentric system is employed as the imaging system. In the embodiment of the invention shown in FIG. 4, the imaging system is a compact imaging system, since the light passing through it is redirected by mirror 307.

Similarly, fiber bundle 411 contains both input and output fibers, so that fiber bundle 411 also acts as both input and output ports. Light from input fibers passes through a respective associated micro lens of first micro lens array 412. The light is reflected off of a corresponding associated micro mirror of first MEMS device 113 and passes through an imaging system which is made up of lenses 115 and 119 in FIG. 4. As noted hereinabove, although two lenses are shown making up the imaging system, this is for pedagogical and clarity purposes only. Those of ordinary skill in the art will readily appreciate that any imaging system, e.g., a system using one or more lenses, may be employed. In one embodiment of the invention, a telecentric system is employed as the imaging system. In the embodiment of the invention shown in FIG. 4, the imaging system is a compact imaging system, since the light passing through it is redirected by mirror 317.

The beams of light exiting from each imaging system pass through prism 141. As in the previously described embodiments of the invention, for light coming from the imaging systems the function of prism 141 is to bend the paths of the image of first MEMS device 103 and the image of second MEMS device 113. In the embodiment of the invention shown in FIG. 4, the bending is performed so that after passing through prism 141 the resulting image appears as if first MEMS device 103 and second MEMS device 113 are adjacent to each other with the point at which they meet being along the line that passes from the center of mirror 413 through the center of prism 141. Thus, in accordance with the principles of the invention, an image is produced of a single input MEMS device having the combined size of first MEMS device 103 and second MEMS device 113. This image acts as a virtual MEMS input device.

The images of first MEMS device 103 and second MEMS device 113 are reflected by mirror 413. Mirror 413 is a conventional mirror which may be flat, functioning as a planar mirror, or it may be curved, to incorporate the function performed by the field lens in other embodiments of the invention described herein.

The beams of light are reflected back by mirror 413 toward prism 141 as return beams. Prism 141 changes the direction of the return beams in the same manner as prism 245 described hereinabove. More specifically, for light coming from mirror 413 on its way to one of the imaging systems, prism 141 performs the inverse of the function that it performed for light coming from the imaging systems going toward mirror 413. To this end, prism 141 directs the light incident on it in two directions, the first being through the imaging system made up of lens 105 and lens 109 with the second being through the imaging system made up of lens 115 and 119. Those beams which are incident on prism 141 at a point which corresponds to an image of first MEMS device 103 are directed by prism 141 to the imaging system made up of lenses 105 and 109. Likewise, those beams which are incident on prism 141 at a point which corresponds to an image of second output MEMS device 113 are directed by prism 141 to the imaging system made up of lenses 115 and 119.

Typically the return beams are incident upon a different micro mirror than the micro mirror that initially reflected them towards mirror 413, but this is not a requirement, and for any input beam of light the return beam may indeed be incident the same micro mirror from which it was reflected towards mirror 413. Doing so enables any fiber in the fiber bundle to be connected to any other fiber in the fiber bundle including itself.

Each return beam then passes through the respective imaging system to which it is directed and is then reflected by the micro mirror of the corresponding one of first and second MEMS device 103 and 113 toward a respective fiber of the associated one of fiber bundles 401 and 411 that is to act as the output port for the beam. After being reflected from the micro mirror, but prior to entering the fiber, the beam passes through a micro lens of the one of micro lens arrays 402 and 422 that is associated with the fiber that is acting as the output port for the beam.

Figure 5:
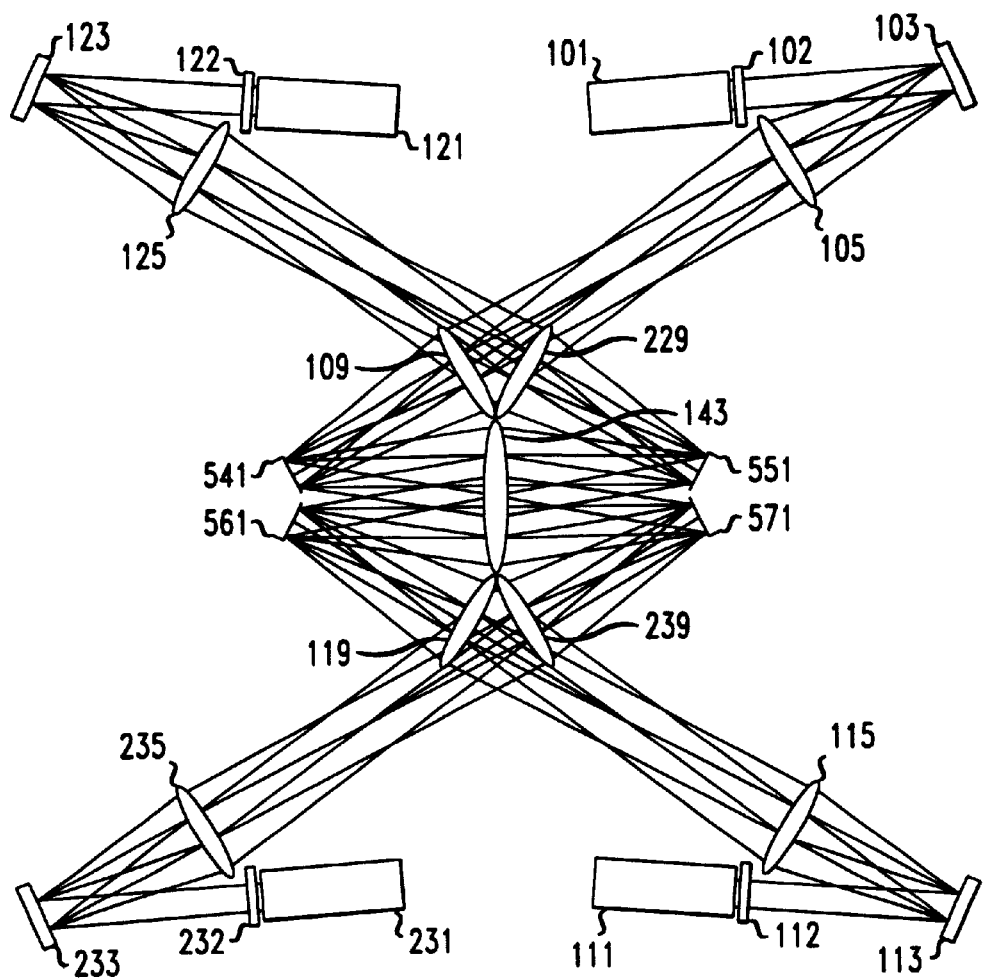
FIG. 5 shows an all-optical switching system which has an optical path equivalent to the optical paths shown in FIG. 2 but in which mirrors are employed in lieu of the prisms of FIG. 2.

FIG. 5 shows another embodiment of an all-optical switching system which has an optical path equivalent to the optical paths shown in FIG. 2. However, mirrors are employed in FIG. 5 in lieu of prisms 141 and 245 which results in the optical paths following different spatial paths. This results in a more compact system arrangement. Shown in FIG. 5 are the same elements as is shown in FIG. 2 except that prism 141 and 245 have been removed and instead the additional elements of mirrors 541, 551, 561, and 571 have been added. The operation of all elements of FIG. 5 is the same as described for the like numbered components of FIGS. 1 and 2.

The function of mirror 541 and 561 is similar to the function of prism 141 in that they bend the paths of the image of first input MEMS device 103 and the image of second input MEMS device 113. In the embodiment of the invention shown in FIG. 5, the bending is performed so that after passing through mirrors 541 and 561 the resulting image appears as if first input MEMS device 103 and second input MEMS device 113 are adjacent to each other with the point at which they meet being along the line that passes from the center of field lens 143 through the point at which mirrors 541 and 561 meet. Note, however, that the use of mirrors in lieu of a prism changes the direction of the light beams, thereby providing a more compact structure. Thus, in accordance with the principles of the invention, an image is produced of a single input MEMS device having the combined size of first input MEMS device 103 and second input MEMS device 113. This image acts as a virtual MEMS input device.

In the embodiment of the invention shown in FIG. 5, there are at least two distinct mirrors, one for bending the image of first input MEMS device 103 and the other for bending the image of second input MEMS device 113. In practice, the two sections may be joined to form a single integrated mirror. Preferably, all the beams of light of the image of first input MEMS device 103 are bent the same amount and similarly the beams of light of the image of second input MEMS device 113 are all bent the same amount. However, the amounts by which all the beams of light of the image of first input MEMS device 103 are bent need not be the same as the amount that all the beams of light of the image of second input MEMS device 113 are bent. Those of ordinary skill in the art will recognize that the function of mirrors 541 and 561 may be carried out with various mirror arrangements, e.g., curved mirrors, which may be supplemented by additional mirror or lens functions. The particular arrangement for carrying out the function of mirrors 541 and 561 will be selected based on design considerations such as cost and overall optical system architecture.

The function of mirror 551 and 571 is similar to the function of prism 245 in that they bend the paths of the image of first output MEMS device 123 and the image of second output MEMS device 233. In the embodiment of the invention shown in FIG. 5, the bending is performed so that after passing through mirrors 551 and 571 the resulting image appears as if first output MEMS device 123 and second output MEMS device 233 are adjacent to each other with the point at which they meet being along the line that passes from the center of field lens 143 through the point at which mirrors 551 and 571 meet. Note, however, that the use of mirrors in lieu of a prism changes the direction of the light beams, thereby providing a more compact structure. Thus, in accordance with the principles of the invention, an image is produced of a single output MEMS device having the combined size of first output MEMS device 123 and second output MEMS device 233. This image acts as a virtual MEMS output device.

In the embodiment of the invention shown in FIG. 5, there are at least two distinct mirrors, one for bending the image of first output MEMS device 123 and the other for bending the image of second output MEMS device 233. In practice, the two sections may be joined to form a single integrated mirror. Preferably, all the beams of light of the image of first output MEMS device 123 are bent the same amount and similarly the beams of light of the image of second output MEMS device 233 are all bent the same amount. However, the amounts by which all the beams of light of the image of first output MEMS device 123 are bent need not be the same as the amount that all the beams of light of the image of second output MEMS device 233 are bent. Those of ordinary skill in the art will recognize that the function of mirrors 551 and 571 may be carried out with various mirror arrangements, e.g., curved mirrors, which may be supplemented by additional mirror or lens functions. The particular arrangement for carrying out the function of mirrors 551 and 571 will be selected based on design considerations such as cost and overall optical system architecture.

Figure 6:
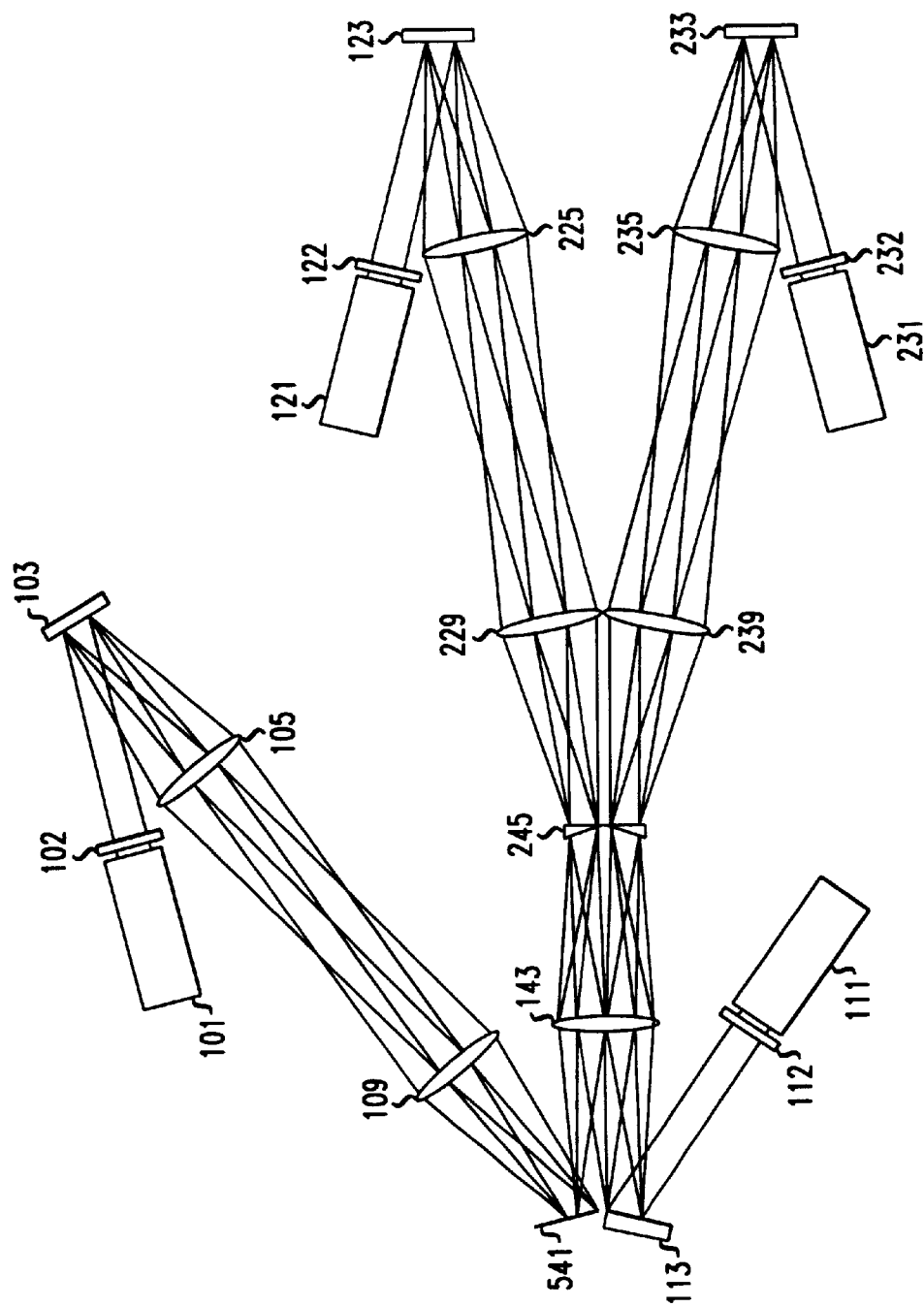
FIG. 6 shows another embodiment of an all-optical switching system which combines for use in its input section an actual MEMS device with an image of a MEMS device.

FIG. 6 shows another embodiment of an all-optical switching system which combines for use in its input section an actual MEMS device with an image of a MEMS device.

Shown in FIG. 6 are a) first input fiber bundle 101, b) first input micro lens array 102, c) first input MEMS device 103, d) lens 105, e) lens 109, f) second input fiber bundle 111, g) second input micro lens array 112, h) mirror 541, i) second input MEMS device 113, j) prism 245, k) first output fiber bundle 121, l) first output micro lens array 122, m) first output MEMS device 123, n) prism 245, o) field lens 143, q) lens 225, r) lens 229, s) second output fiber bundle 231, t) second output micro lens array 232, u) second output MEMS device 233, v) lens 235, and w) lens 239.

First input fiber bundle 101 supplies optical signals to be switched. More specifically, each fiber of first input fiber bundle 101 is an input port to the switching system of FIG. 1. The light supplied by each fiber of first input fiber bundle 101 passes through a respective corresponding micro lens that is part of first input micro lens array 102. The function of each micro lens is to collimate the beam of light supplied from its respective associated input fiber. In alternative embodiments of the invention, in lieu of employing a separate micro lens array, a lens may be integrated with each fiber of input fiber bundle 101 in an arrangement that forms a collimator.

The beams of light passing from first input micro lens array 102 each falls upon a respective micro mirror of first input MEMS device 103. Each micro mirror of first input MEMS device 103 is set to reflect the beam of light incident on it at a respective prescribed angle. The particular angle is prescribed so that, in combination with the angle of a corresponding respective micro mirror of one of first output MEMS device 123 and second output MEMS device 233, the light is directed to a preselected fiber in either first output fiber bundle 121 or second output fiber bundle 231.

After reflecting off of its particular micro mirror, each beam of light passes through lens 105, then lens 109, to mirror 541. Lens 105 and lens 109 form an imaging system. The imaging system is arranged so that the angles of each micro mirror of first input MEMS device 103 is reproduced at mirror 541. Thus, there is a direct imaging of each micro mirror of first input MEMS device 103 to the location of mirror 541. Note that although two lenses are shown making up the imaging system, this is for pedagogical and clarity purposes only. Those of ordinary skill in the art will readily appreciate that any imaging system, e.g., a system using one or more lenses, may be employed.

In one embodiment of the invention, a telecentric system, also known as a 4 f system is employed as the imaging system. By using a telecentric system, such systems being well known in the art, the angle of reflection of the light of each beam from first input MEMS device 103 is reproduced when that light reaches mirror 541. Note that, since the telecentric system may be inverting, the respective corresponding micro mirrors of first output MEMS device 123 may not be in the same location as they would be had an imaging system not been employed. However, since the one-to-one nature of the mapping of micro mirrors is preserved by the imaging system, the inversion can easily be accounted for in the control software of the system to properly tilt the micro mirrors of first output MEMS device 123 to direct the light from the image to the prescribed output fiber of first output fiber bundle 121.

Note that the imaging system may also change the size of the image as compared with the original. This would allow the micro mirrors of first output MEMS device 123 and second output MEMS device 233 to be a different size that those of first input MEMS device 103, as well as allowing the micro mirror spacing of first output MEMS device 123 and second output MEMS device 233 to be different than that of first input MEMS device 103. Doing so, however, will scale the angle of tilt of each of the micro mirrors of first input MEMS device 103 as it appears in the image, which will necessitate complementary compensation of the actual tilt in order to properly address the image to the micro mirrors of first output MEMS device 123 and second output MEMS device 233.

Furthermore, it is possible to employ optical splitters, e.g., between lenses 105 and 109, to create multiple signal paths through the system, e.g., to implement a multicast, broadcast, monitoring, protection and restoration functions. Advantageously, great flexibility in system design is achieved.

Second input fiber bundle 111 also supplies optical signals to be switched. More specifically, each fiber of second input fiber bundle 111 is also an input port to the switching system of FIG. 1. The light supplied by each fiber of second input fiber bundle 111 passes through a respective corresponding micro lens that is part of second input micro lens array 112. The function of each micro lens is to collimate the beam of light supplied from its respective associated input fiber. In alternative embodiments of the invention, in lieu of employing a separate micro lens a lens may be integrated with each fiber of fiber bundle second input 111 in an arrangement that forms a collimator.

The beams of light passing from second input micro lens array 112 each falls upon a respective micro mirror of second input MEMS device 113. Each micro mirror of second input MEMS device 113 is set to reflect the beam of light incident on it at a respective prescribed angle. The particular angle is prescribed so that in combination with the angle of a corresponding respective micro mirror of first output MEMS device 123 or second output MEMS device 233 the light is directed to a preselected fiber in first output fiber bundle 121 or second output fiber bundle 231.

After reflecting off of its particular micro mirror, each beam of light passes to field lens 143.

The function of mirror 541 is to bend the path of the image of first input MEMS device 103 so that the resulting image appears as if first input MEMS device 103 is adjacent to second input MEMS device 113 with the point at which the image and actual MEMS device meet being along the line that passes from the center of field lens 143 through the center of prism 245. Thus, in accordance with the principles of the invention, it appears that there is a single input MEMS device having the combined size of first input MEMS device 103 and second input MEMS device 113. This combination acts as the total input MEMS device, which is a virtual MEMS device.

After passing through field lens 143, the light enters the output section of the switching system, i.e., all elements in FIG. 6 to the right of field lens 143. The operation field lens 143 and the output section of FIG. 6 is the same as described for the like numbered components of the output section of FIG. 2.

Figure 7:
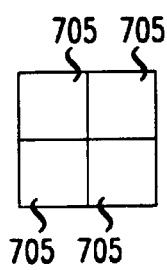
FIG. 7 shows some of the possible tiling arrangements.
Figure 7:
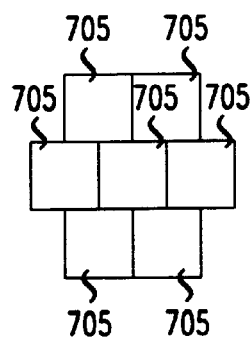
Figure 7:
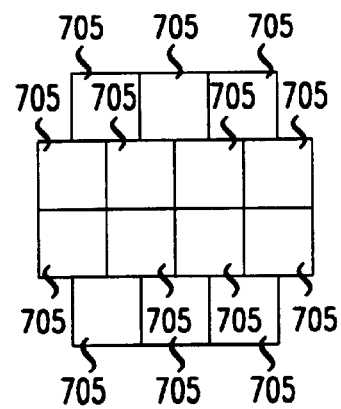

Note that for pedagogical and clarity purposes, the embodiments shown have only combined for the input section or the output section at most two MEMS devices, either images thereof or a real portion and an image portion. However, it is possible to have embodiments of the invention in which there are stacked more than two MEMS device, e.g., by arranging any of the preceding embodiments three dimensionally, e.g., out of the plane of the paper on which the embodiments are shown. Such arrangements allow the MEMS devices, or images thereof, to be "tiled" to create even larger virtual MEMS devices for input, output, or both. FIG. 7 shows tiling arrangements 701, 702, and 703 for MEMS devices, or images thereof, 705 which are some of the various tiling arrangements that are possible. Those of ordinary skill in the art will be readily able to develop other such arrangements.

Figure 8:
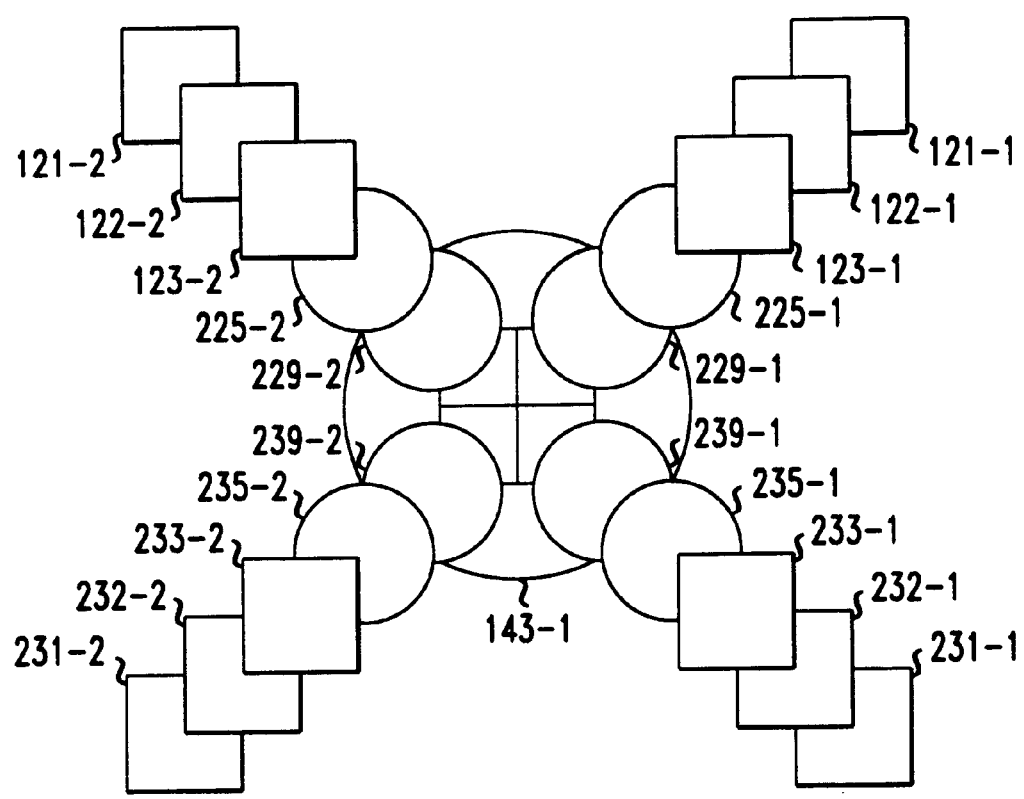
FIG. 8 shows an end-on view of one tiling arrangement in which the image of four output MEMS devices are joined to from one large output MEMS device.

FIG. 8 shows an end-on view of one such arrangement in which the image of four output MEMS devices are joined to from one large output MEMS device. Although not visible in FIG. 8, because they are directly behind the elements shown in FIG. 8, four input MEMS devices are similarly joined to from one large input MEMS device. Alternatively, one may consider FIG. 8 to be an end-on view of the output section but looking from the opposite end. The numbers of the elements shown in FIG. 1 correspond functionally to the like numbered elements of FIG. 2, but with a suffix of 1 added for those elements that were shown originally in FIG. 2 and a suffix of 2 added for those elements introduced in FIG. 8 to form the even larger array.

Those of ordinary skill in the art will readily appreciate how to orient the various components and mirrors of the system in order to achieve their desired size and configuration.

Note that instead of optical fibers supplying the light beams as inputs, they may be supplied by an optical source, e.g., a laser or light emitting diode, planar wave guides, or the like. Likewise, instead of having optical fibers receiving the light beams as outputs the light beams could be received by other receivers such as photo detectors, planar wave guides, or the like.

What is claimed is:

1. An optical switch, comprising
   a first micro-electromechanical system (MEMS) device containing a first number of micro mirrors;
   a second MEMS device containing a second number of micro mirrors; and
   a first imaging system optically coupled to said first MEMS device at one optical end so as to produce an image of said first MEMS device at the optical end of said imaging system opposite to said optical end at which said first MEMS device is located;
   wherein
     (i) said image of said first MEMS device and
     (ii) at least one of the set consisting of (a) said second MEMS device and (b) an image of said second MEMS device,
   form a virtual MEMS device having a number of micro mirrors equal to the sum of said first and second numbers.

2. The invention as defined in claim 1 wherein said image of said first MEMS device is made up of light beams reflected by said micro mirrors of said first MEMS device, each of said light beams having an angle that is a function of the angle of reflection of said light beam from a respective one of said micro mirrors of said first MEMS device off of which it was reflected.

3. The invention as defined in claim 1 wherein said first number and said second number are the same.

4. The invention as defined in claim 1 wherein said image of said first MEMS device is made up of light beams reflected by said micro mirrors of said first MEMS device and said imaging system reproduces the angle of reflection of each beam of light from each respective one of said micro mirrors of said first MEMS device off of which it was reflected.

5. The invention as defined in claim 1 wherein said imaging system is a telecentric system.

6. The invention as defined in claim 1 further comprising a prism for bending light beams coming from the direction of, or going in the direction towards, said first imaging system.

7. The invention as defined in claim 1 further comprising a mirror for bending light beams coming from the direction of, or going in the direction towards, said first MEMS device.

8. The invention as defined in claim 1 further comprising:
a field lens system for processing light which appears to be coming from the direction of, or going in the direction towards, said virtual MEMS device.

9. The invention as defined in claim 1 further comprising an optical fiber bundle containing at least one fiber for supplying light to at least one of the group consisting said first MEMS device and said second MEMS device.

10. The invention as defined in claim 1 further comprising an optical fiber bundle containing at least one fiber for receiving light from at least one of the group consisting of said first MEMS device and said second MEMS device.

11. The invention as defined in claim 1 further comprising a third MEMS device containing a third number of micro mirrors, said micro mirrors of said third MEMS device being arranged to reflect light which appears to be coming from said virtual MEMS device.

12. The invention as defined in claim 1 further comprising a third MEMS device a containing third number of micro mirrors, said micro mirrors of said third MEMS device being arranged to reflect light onto various micro mirrors of said virtual MEMS device.

13. The invention as defined in claim 1 further comprising a mirror arranged to reflect said image of said virtual MEMS device having a number of micro mirrors equal to the sum of said first and second numbers back toward said image whereby a cross connect with a folded configuration is formed.

14. The invention as defined in claim 1 wherein said first imaging system includes at least one mirror which is placed to achieve a compact configuration.

15. The invention as defined in claim 1 wherein
a third micro-electromechanical system (MEMS) device containing a third number of micro mirrors;
a fourth MEMS device containing a fourth number of micro mirrors; and
a second imaging system optically coupled to said third MEMS device at optical one end so as to produce an image of said third MEMS device at the optical end of said imaging system opposite to said optical end at which said third MEMS device is located;
wherein said fourth imaging system is arranged so that (i) said image of said third MEMS device and (ii) at least one of the set consisting of said fourth MEMS device and an image of said fourth MEMS device, form a virtual MEMS device having a number of micro mirrors equal to the sum of said third and fourth numbers; and
wherein said virtual MEMS device having a number of micro mirrors equal to the sum of said first and second numbers and said virtual MEMS device having a number of micro mirrors equal to the sum of said third and fourth numbers are arranged to form a cross-connect.

16. The invention as defined in claim 15 wherein said third number and said fourth number are the same.

17. The invention as defined in claim 15 wherein said first number, said second number, said third number and said fourth number are the same.

18. The invention as defined in claim 15 wherein said second imaging system includes at least one mirror which is placed to achieve a compact configuration.

19. The invention as defined in claim 15 further comprising at least one mirror, and wherein said virtual MEMS device having a number of micro mirrors equal to the sum of said first and second numbers and said virtual MEMS device having a number of micro mirrors equal to the sum of said third and fourth numbers are arranged to be adjacent to each other so as to form a virtual MEMS device having a number of micro mirrors equal to the sum of said first, said second, said third and said fourth numbers, said mirror being placed so as to reflect said image of said virtual MEMS device having a number of micro mirrors equal to the sum of said first, said second, said third and said fourth numbers back toward said image of said virtual MEMS device having a number of micro mirrors equal to the sum of said first, said second, said third and said fourth numbers so as to form a cross connect with a folded configuration.

20. The invention as defined in claim 1 further comprising:
a third micro-electromechanical system (MEMS) device containing a third number of micro mirrors;
a fourth MEMS device containing a fourth number of micro mirrors; and
a second imaging system optically coupled to said third MEMS device at one optical end so as to produce an image of said third MEMS device at the optical end of said imaging system opposite to said optical end at which said third MEMS device is located;
wherein said fourth imaging system is arranged so that (i) said image of said third MEMS device and (ii) at least one of the set consisting of said fourth MEMS device and an image of said fourth MEMS device, form a virtual MEMS device having a number of micro mirrors equal to the sum of said third and fourth numbers;
and wherein said virtual MEMS device having a number of micro mirrors equal to the sum of said first and second numbers and said image of a virtual MEMS device having a number of micro mirrors equal to the sum of said third and fourth numbers are arranged to be adjacent to each other so as to form a virtual MEMS device having a number of micro mirrors equal to the sum of said first, said second, said third and said fourth numbers.

21. The invention as defined in claim 20 wherein said virtual MEMS device having a number of micro mirrors equal to the sum of said first, said second, said third and said fourth numbers is employed as one of the group consisting of an input MEMS device in an all-optical cross-connect and an output MEMS device in an all-optical cross-connect.

22. An optical switch, comprising a first micro-electromechanical system (MEMS) device containing a first number of micro mirrors;

a second micro-electromechanical system (MEMS) device containing a second number of micro mirrors;

a first imaging system optically coupled to said first MEMS device so as to produce an image of said first MEMS device;

a second imaging system optically coupled to said second MEMS device so as to produce an image of said second MEMS device;

wherein said first and second imaging systems are arranged so that said image of said first MEMS device and said image of said second MEMS device form a virtual MEMS device having a number of micro mirrors equal to the sum of said first and second numbers.

23. A method for use in an optical switch, comprising the steps of:

coupling (i) an image of a first micro-electromechanical system (MEMS) device containing a first number of micro mirrors and (ii) at least one of the set consisting of (a) a second MEMS device containing a second number of micro mirrors and (b) an image of said second MEMS device, so as to form a virtual MEMS device having a number of micro mirrors equal to the sum of said first and second numbers.

24. The invention as defined in claim 23 further comprising the step of forming said image of said first MEMS device such that said image of said first MEMS device is made up of light beams reflected by said micro mirrors of said first MEMS device and each of said light beams has an angle that is a function of the angle of reflection of said light beam from a respective one of said micro mirrors of said first MEMS device off of which it is reflected.

25. The invention as defined in claim 23 wherein said further comprising the step of forming said image of said first MEMS device by reproducing the angle of reflection of each of said light beams from each respective one of said micro mirrors of said first MEMS device off of which it is reflected.

26. The invention as defined in claim 23 further comprising the step of forming said image of said first MEMS device using a telecentric imaging system.

27. An optical switch, comprising a first micro-electromechanical system (MEMS) device containing a first number of micro mirrors;

a second MEMS device containing a second number of micro mirrors;

a first imaging system optically coupled to said first MEMS device so as to produce an image of said first MEMS device, wherein said path of said first imaging system is arranged so that said image of said first MEMS device is made up of light beams reflected by said micro mirrors of said first MEMS device, each of said light beams having an angle that is a function of the angle of reflection of said light beam from a respective one of said micro mirrors of said first MEMS device off of which it was reflected; and wherein (i) said image of said first MEMS device and (ii) at least one of the set consisting of (a) said second MEMS device and (b) an image of said second MEMS device, are arranged to form a virtual MEMS device having a number of micro mirrors equal to the sum of said first and second numbers.

28. An optical switch, comprising first micro-electromechanical system (MEMS);

second MEMS means; and first imaging means optically coupled to said first MEMS means at one optical end so as to produce an image of said first MEMS means at the optical end of said imaging means opposite to said optical end at which said first MEMS means is located;

(i) said image of said first MEMS means and (ii) at least one of the set consisting of (a) said second MEMS means and (b) an image of said second MEMS means, forming a virtual MEMS device having size equal to the sum of said first and second MEMS means.

* * * * *